Figure 1:
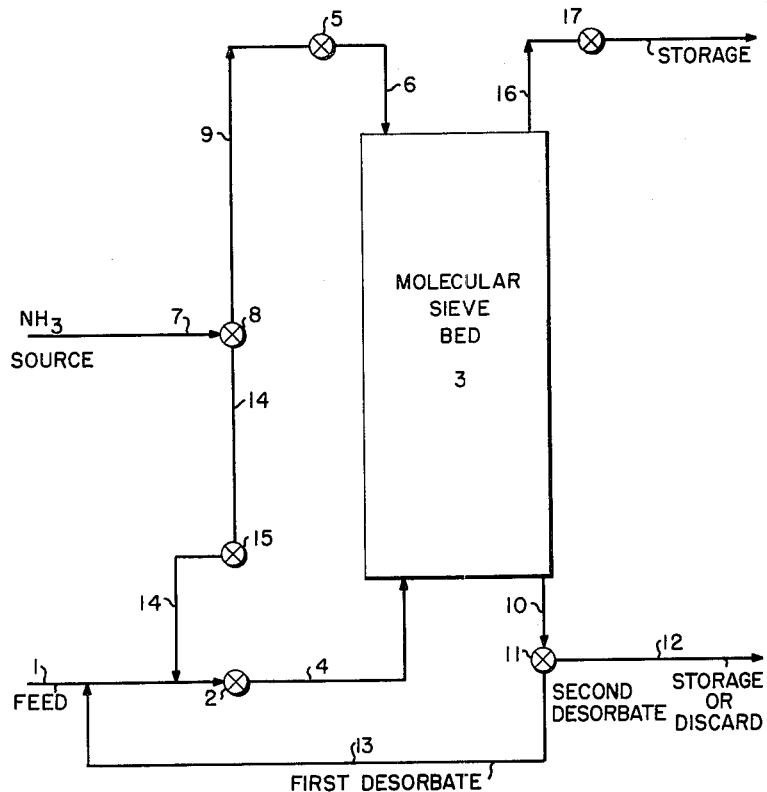

United States Patent Office 3,228,995
Patented Jan. 11, 1966

3,228,995
SEPARATION PROCESS
William R. Epperly, Murray Hill, and Patrick P. McCall, Monmouth, N.J., assignors to Esso Research and Engineering Company, a corporation of Delaware
Filed Sept. 12, 1962, Ser. No. 223,078
16 Claims. (Cl. 260—676)

This invention relates to a process for effecting separation of aromatics and/or nonhydrocarbons from saturated hydrocarbons and/or olefins, as well as separating olefins from saturated hydrocarbons. In particular, it relates to a process for purifying saturated hydrocarbons and/or olefins. Even more particularly, it relates to purifying n-paraffins in a process which utilizes a zeolite adsorbent and a displacing agent.

A particularly preferred facet of the invention is the purification of n-paraffins. Normal paraffins are items of commerce which are finding a rapidly growing market. For instance, in the manufacture of synthetic detergents such as sulfonated alkyl aryls and alkyl sulfonates, it is desirable to utilize straight chain paraffins as the alkyl substituent as contrasted to branch chain, alkyl substituents. Not only does this impart better detergent properties to the ultimate sulfonate but such detergents are biodegradable. This is of prime importance where it is desired to avoid pollution of various natural resources such as streams, rivers, etc. There are, of course, other important uses of normal paraffinic hydrocarbons such as flame profing agents, intermediates in aromatization, solvents, reaction diluents, and the like. Isoparaffins are generally disadvantageous for the above uses. They are difficult to chlorinate fully for flame proofing agents and are less stable than n-paraffins in solvent application.

Although pure n-paraffins are desirable for many uses, there are still some specialized uses where saturated hydrocarbons relatively free of aromatics, sulfur and color bodies are very desirable. Isoparaffins, for example, are preferred solvents for use in the manufacture of polyolefin plastics, in printing inks, in paints and the like. Relatively pure saturated hydrocarbons (normal, iso, cyclo) are used as:

Intermediate quality solvents in the naphtha range
High quality kerosenes and intermediate quality solvents in the kerosene range
White oils and high V.I. oils in the lube oil range.

The instant invention is concerned with the purification of saturated hydrocarbons and/or olefins particularly normal paraffins regardless of their source. Although n-paraffins are the most important species and will be used trhoughout the body of the specification, it will be understood that various mixtures of saturated hydrocarbons or the particular saturated hydrocarbons per se as well as olefins can likewise be purified. By way of illustration, U.S. Patent 2,899,379 teaches a method of obtaining n-paraffins which involves adsorbing a hydrocarbon stream containing n-paraffins on a zeolite adsorbent and desorbing the adsorbent to obtain a substantially normal paraffin desorbate. Invariably, any process designed to produce n-paraffins or other saturated hydrocarbons and/or olefins produces a product which also contains relatively small amounts of contaminants such as aromatics, sulfur, and color bodies.

Such a product must be further treated to remove the color bodies and other impurities in order to meet stringent customer specifications. For instance, typical n-paraffins, straight from the process which produces them, will contain as much as 1 to 3 wt. percent aromatics and 100 to 1000 p.p.m. of sulfur. Typical product specifications for n-paraffins for commercial use are not more than 0.1 wt. percent aromatics and not more than 10 p.p.m. sulfur. These specifications are stringent since very small amounts of aromatics and sulfur can act as catalyst poisons and reaction stoppers. Therefore, it is essential in most processes which utilize n-paraffins that these contaminants be at a minimum. Moreover, the purity, appearance and color of an n-paraffin product are important factors in competitive marketing.

In a purification process of the type contemplated, it is important from a commercial standpoint that the life of the adsorbent be quite prolonged. It is an advantage of the instant invention that this desirable attribute is obtained in a high degree.

It has now been discovered and forms the essence of this invention that saturated hydrocarbons and/or olefins, particularly n-paraffins, which contain impurities can be easily and efficiently purified by an adsorption process which is described herein.

In brief, the preferred embodiment of the process comprises two steps, i.e. adsorption and desorption, which are both carried out preferably in vapor phase in a fixed bed at about atmospheric pressure, but preferably slightly above atmospheric pressure. The process can also be operated in liquid phase. The essential feature of this process resides in certain amounts of feed processed in an adsorption step, which prevents deactivation of the adsorbent. As preferred but optional facets of the invention, recycle of a portion of the desorbate from each desorbate portion of the cycle to feed, and/or the use of a displacing agent in the feed can be employed. The desorbate which will be recycled to feed is referred to herein as recycle desorbate. The same displacing agent is also used to desorb the adsorbent.

A displacing agent is defined as a polar or polarizable material having an appreciable affinity for the zeolitic adsorbent compared with the material desired to be desorbed. The displacing agent will generally have a heat of desorption approximately equal to the material it is desired to desorb. Displacing agents are also referred to as desorbents, displacing mediums and desorbing mediums. Suitable displacing agents for the process of this invention include $SO_2$, $NH_3$, $CO_2$, $C_1$ to $C_5$ alcohols such as methanol and propanol, glycols such as ethylene glycol and propylene glycol, halogenated compounds such as methyl chloride, ethyl chloride, methyl fluoride, nitrated compounds such as nitromethane, and the like. Preferably the displacing agents are used in a gaseous state.

A preferred displacing agent has the general formula:

wherein $R_1$, $R_2$ and $R_3$ are selected from the group consisting of hydrogen and $C_1$ to $C_5$ alkyl radicals. Thus, the desorbing material includes ammonia and the $C_1$ to $C_{15}$ primary, secondary and tertiary amines with ammonia being most preferred and the $C_1$ to $C_5$ primary amines being next in order of preference. Examples of preferred primary amines include ethyl amine, methyl amine, butyl amine, and the like.

The adsorbent for use in this invention includes any zeolitic adsorbent having pore sizes of 6 to 20 A., preferably 6.5 to 13 A., and most preferably 7 to 11 A. Thus, any faujasite type adsorbent or type X molecular sieve with monovalent or divalent cations such as Linde 13X or 10X molecular sieve are within the most preferred range. Molecular sieves or zeolites are well known in the art. See, for instance, U.S. 2,966,451.

The critical feature of this invention pertains to the quantity of feed, quantity of impurities in the feed, and quantity of displacing agent used in the adsorption portion of each cycle and the quantity of displacing agent used in the desorption portion of the cycle. These quantities are of the essence. They can seriously affect both product purity and capacity maintenance. Quantities outside the scope of the invention can result in high rates of deactivation. By capacity maintenance is meant the ability of the adsorbent to retain its adsorbent capacity so that low levels of impurities are in the product. It is, naturally, desirable to be able to use the same adsorbent at its maximum capacity for many cycles. In general, the mount of feed per cycle will be 0.01 to 5 w./w., preferably 0.02 to 2. For the especially preferred range of $C_{10}$ to $C_{25}$ hydrocarbons, the amount of feed per cycle will be 0.03 to 0.7 w./w.

The amount of feed which can be processed per cycle is reduced as less desorbent per cycle is used to desorb, as the feed molecular weight is increased, as the amount of impurities in the feed is increased, and as the desorption temperature is decreased.

In general, given the feed amounts described elsewhere herein, the time for adsorption can be from $\frac{1}{3}$ to $\frac{1}{60}$, preferably $\frac{1}{4}$ to $\frac{1}{60}$, and especially preferably, $\frac{1}{4}$ to $\frac{5}{30}$ hr. The time for desorption can be from $\frac{1}{3}$ to $\frac{1}{60}$, preferably $\frac{1}{4}$ to $\frac{1}{60}$, and especially preferably, $\frac{1}{4}$ to $\frac{5}{30}$ hr.

The preferred, but optional first desorbate which can be used as recycle desorbate can be characterized in at least two ways, one as a quantity based on adsorbent as 0 to 0.3, preferably 0 to 0.09, and most preferably 0.01 to 0.07 w./w., the other as a percent of total desorbate such as 0 to 98, preferably 0 to 90, and most preferably, 50 to 80 wt. percent of the total desorbate. Generally, the first desorbate will come off in the first 0.1 to 20, e.g., 0.1 to 10, percent of the time of the total desorption cycle.

The significance of first desorbate lies in the fact that a relatively large proportion of the desired hydrocarbon, e.g. n-paraffin, product is adsorbed along with the unwanted impurities. Upon desorption both the impurities and n-paraffin are desorbed from the adsorbent and usually discarded. Although this purifies a sizeable part of a hydrocarbon, e.g., n-paraffin, feed, still the hydrocarbons, e.g. n-paraffins, in the desorbate are discarded and thus wasted.

This optional, but preferred, feature of the invention makes use of the unexpected finding that at the particular operating conditions described herein, the first portion of the desorbate is primarily n-paraffins. This portion of the desorbate can be recycled to feed. The remainder of the desorbate is the portion that has the impurities concentrated therein. Thus, by effecting a first desorbate cut and recycling it to feed, a much greater yield of n-paraffins can be realized in the over-all process.

The saturated hydrocarbons and/or olefins to be purified by means of this process include $C_3$ to $C_{60}$, preferably $C_5$ to $C_{40}$, and especially preferred $C_{10}$ to $C_{25}$ saturated hydrocarbons and/or olefins.

Figure 2:
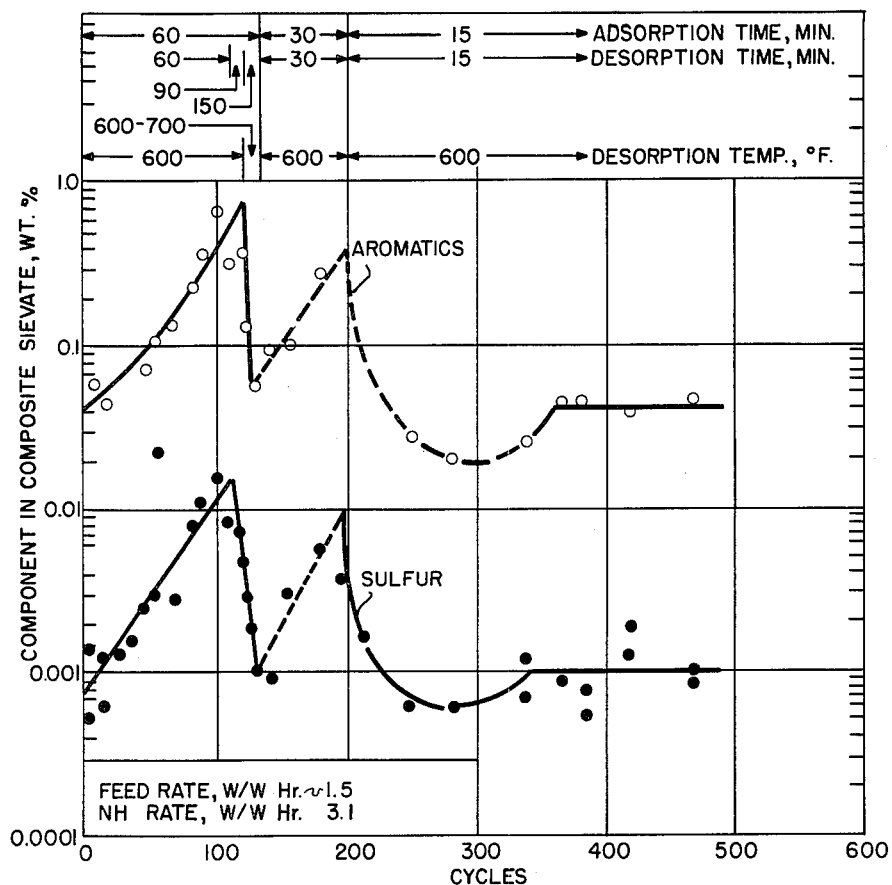

The invention can be fully understood by referring to both the preceding and following description, the claims taken in conjunction therewith and by the accompanying drawing wherein FIGURE 1 is a schematic diagram of an apparatus suitable for effecting the process of the invention. FIGURE 2 is a graphical representation of some of the data of the examples.

FIGURE 1 shows a 13X sieve bed with means for alternately charging feed to the bed and desorbing the bed.

Referring now to FIGURE 1, a $C_{10}$ to $C_{18}$ feed comprising substantially n-paraffins having aromatics, olefins, nonhydrocarbons and sulfur as impurities, is fed at 20 p.s.i.a. into line 1 through valve 2 then into bed 3 through line 4 at the rate of 1.0 w./w./hr. The sievate passes out of the bed through line 16, valve 17. After approximately 10 minutes, valves 2 and 16 are closed. Valve 5 is then opened to flow ammonia into bed 3 through line 6. The ammonia is obtained from a source (not shown) from which it flows through line 7, thence into valve 8, into line 9 and finally into valve 5. 3.1 w./w./hr. of ammonia is flowed into bed 3 under a pressure of 30 p.s.i.a. for about 10 minutes. The desorbate flows out of bed 3 through line 10, valve 11 and to storage through line 12. However, the first 67 wt. percent desorbate in the desorbate cycle from bed 3 flows through valve 11 and through line 13 and thence into feed line 1. The remainder of the desorbate of each cycle is then flowed through line 10, valve 11 and thence through line 12 for discard or, if desired, storage.

The feed contains $NH_3$ which is supplied partially from line 14 and partially from the $NH_3$ in the first desorbate which is flowed through line 13 to feed line 1. The $NH_3$ in line 14 is supplied from the $NH_3$ source that supplies $NH_3$ for desorption and is flowed through line 7 into valve 8 and thence through valve 15 and line 14 to line 1. Without ammonia in the feed, a much larger desorbate recycle would be required at the preferred ad- temperature of 600° F. and 20 p.s.i.a. pressure. The ammonia rate in the feed in this illustration was 0.060 w./w./hr.

During the adsorption portion of the cycle substantially pure and colorless n-paraffin is removed from bed 3 through line 16 and valve 17 for storage. It will be understood that although the specific illustration given above relates to one adsorbent bed, several beds can conveniently be used together. For instance, one bed could be on adsorption while another bed is on desorption and vice versa. Moreover, it is drawn to an n-paraffin feed and an $NH_3$ displacing agent. Other feeds and displacing agents can be used.

The following table summarizes the operating, preferred, and especially preferred conditions for the process of the invention.

|  | Operating | Preferred | Especially Preferred |
|---|---|---|---|
| Adsorption (per Cycle): |  |  |  |
| Temperature, ° F | 400 to 800 | 500 to 750 | 550 to 700 |
| Pressure, p.s.i.a. | 1 to 100 | 10 to 30 | 15 to 25 |
| Total Average Feed Rate,[4] w./w./hr. | 0.2 to 10 | 0.5 to 5 | 1 to 2 |
| Feed/Cycle, w./w. | 0.01 to 5 | 0.02 to 2 | 0.03 to 0.7 |
| Removable Impurities in Feed as Percent of Feed | 0.0001 to 5 | 0.01 to 3.5 | 0.08 to 3 |
| Feed | $C_3$ to $C_{60}$ | $C_5$ to $C_{40}$ | $C_{10}$ to $C_{25}$ |
| Displacing Agent[1] in Feed, Wt. of Displacing Agent per Weight of Feed | 0 to 10 | 0 to 5 | 0.01 to 0.2 |
| Desorption (per Cycle): |  |  |  |
| Temperature, ° F | 400 to 800 | 500 to 750 | 550 to 700 |
| Pressure, p.s.i.a. | 1 to 100 | 15 to 65 | 15 to 35 |
| Size of First Desorbate Cut, w./w./Cycle | 0.005 to 0.3 | 0.01 to 0.09 | 0.02 to 0.07 |
| Displacing Agent | $R_1$[2] $\diagup$ $N - R_2$ $\diagdown$ $R_3$ | $R_1$[3] $\diagup$ $NH_2$ | $NH_3$ |
| Displacing Agent Rate, w./w./hr. | 0.1 to 10 | 1 to 5 | 2 to 4 |
| Displacing Agent, w./w. per Cycle | 0.01 to 5 | 0.02 to 2 | 0.03 to 0.7 |

[1] Same displacing agent as used in desorption.
[2] $R_1$, $R_2$, and $R_3$ are selected from the group consisting of H and $C_1$ to $C_5$ alkyl groups.
[3] $R_1$ is selected from the group consisting of $C_1$ to $C_5$ alkyl groups.
[4] Fresh feed plus recycle.

The invention is further illustrated by the following examples.

*Example 1*

To illustrate the importance of the amount of feed processed per cycle on capacity maintenance, the following experiment was carried out. A cyclic run consisting of 480 cycles was made with an n-paraffin feed comprising $C_{12}$ to $C_{23}$ n-paraffins derived from an Aramco crude and containing 1.1 wt. percent aromatics and 0.025 wt. percent sulfur. The adsorbent bed consisted of 45 grams of Linde 13X sieve and 5 grams of F-1 alumina (at the feed inlet), both 14/30 mesh. One cycle consisted of a single adsorption and a single desorption step. Adsorption was carried out at 600° F. and 15 p.s.i.a. with a feed rate of approximately 1.5 w./w./hr. and an ammonia rate of 0.12 w./w./hr. Desorption was at 600° F. and 30 p.s.i.a. with ammonia at the rate of 3.12 w./w./hr. The cycle time, which is the time on adsorption or desorption, was varied from 60 to 15 minutes to vary the amount of feed per cycle. The time on desorption was equal to that on adsorption so the ratio of feed to ammonia to desorb was held constant.

With 1.5 w./w./cycle of feed, the bed capacity decreased rapidly as shown by the rapid increase in the aromatic content of the sievate. See FIGURE 2. The capacity was restored by desorbing at 700° F., and then the amount of feed/cycle was reduced to 0.73 w./w./cycle. Again, the bed deactivated and feed was reduced to 0.40 w./w./cycle. As FIGURE 2 shows, there was no indication of deactivation in 280 cycles with this amount of feed. In FIGURE 2 the purity shift at cycle 340 reflects a unit change which contaminated the product with feed.

This example demonstrates that the deactivation noted with 0.73 and 1.5 w./w./cycle of feed was due to the buildup of a desorbable heel of aromatics. By reducing the amount of feed per cycle the heel is maintained closer to the feed inlet, and the aromatic transfer zone is contained within the bed.

*Example II*

To show the importance of the desorbate recycle on product yield, desorbate from the run of Example I was collected in two cuts, that desorbed in the first minute and that desorbed in the remaining 14 minutes. The total desorbate collected was 21.1% of the feed; therefore, the product yield without desorbate recycle was only 78.9%. Analyses on the first desorbate cut, which was 19.6% of the feed, showed it was very close to feed composition and could be recycled without changing the feed composition appreciably. The impurities were concentrated in the second desorbate cut, which would be rejected. These data are summarized below.

| Sample | Desorbate Cut 1 | Desorbate Cut 2 | Feed |
|---|---|---|---|
| Cut Size, Percent of Feed | 19.6 | 1.5 | |
| Aromatics, Wt. Percent | 2.19 | 30.5 | 1.1 |
| Lamp Sulfur, Wt. Percent | 0.043 | 0.458 | 0.025 |

These data, therefore, indicated that a yield of up to 98.5% could be obtained by recycling desorbate cut 1 compared with 78.9% without recycle. The cost of a normal paraffin feed of this type is about five cents per pound. On a large-scale operation yield could be quite significant. In a life run of 1300 hours using the feed, desorbate recycle and other process conditions of Example III below the total product contained only 0.05% aromatics and 1 to 3 p.p.m. sulfur. The product had an excellent +35 Saybolt color. After 16 hours at 212° F., the product had a color of +35 Saybolt. After 72 hours at 270° F. in the presence of iron the product had a Saybolt color of +34. Saybolt color was determined by ASTM D-156.

*Example III*

A subsequent run was made with a feed comprising $C_{10}$ to $C_{18}$ n-paraffins derived from San Joaquin crude and containing 2.3% aromatics and 0.0026 wt. percent sulfur. This feed contained 93% n-paraffins, the balance isoparaffins, cycloparaffins, and aromatics by gas chromatograph analysis. The adsorbent bed consisted of 90 grams of Linde 13X, 1/16" extrudates and 10 grams of F-1 alumina (8–14 mesh) at the feed inlet. Adsorption was carried out at 600° F. and 15 p.s.i.a. with a fresh feed rate of 1.2 w./w./hr. and an ammonia rate of 0.060 w./w./hr. The total feed rate including a desorbate recycle of about 0.045 w./w./cycle was about 1.4 w./w./hr. Desorption was at 600° F. and 30 p.s.i.a. with an ammonia flow of 3.12 w./w./hr. The desorbate recycle comprised desorbate from the first minute of each desorption step. The cycle time was 15 minutes.

The product yield with the operation was 92 to 94%. In subsequent runs, yields of up to 96% were obtained. In all these runs, aromatics contents of less than 0.1% were obtained.

*Example IV*

The following experiments were carried out to show that the amount of ammonia in the feed is a balance between product purity and the size of the first desorbate, i.e. desorbate recycle stream and depends on the molecular weight of the feed.

With the conditions of Example III for the $C_{10}$ to $C_{18}$ feed, the size of the desorbate recycle was decreased from 0.045 to 0.025 w./w./cycle by increasing the adsorption ammonia rate from 0.060 to 0.18 w./w./hr. This change, however, also increased the aromatic content of the product from 0.04 wt. percent to 0.2 wt. percent.

With heavier feeds, more ammonia in the feed can be used. An aromatic content of 0.02 wt. percent was obtained with $C_{12}$ to $C_{23}$ n-paraffins using 0.12 w./w./hr. of ammonia in adsorption.

Increasing the amount of displacing agent in the feed reduces the size of the desorbate recycle because it reduces the capacity of the adsorbent for saturates. However, it also decreases the capacity for impurities to some extent and, therefore, lowers product purity. Higher molecular weight impurities are more strongly adsorbed and therefore more displacing agent in the feed can be used at a given level of capacity for impurities.

It is important to note that the process can be operated without displacing agent in the feed. However, when this was done with $C_{10}$ to $C_{18}$ n-paraffin at 600° F., the size of the desorbate recycle increased by 50%.

In the above examples, the adsorbent was Linde 13X sieve which is especially preferred. Any faujasite type zeolite would be operable and is preferred. Although a guard bed of alumina was used at the feed inlet this is merely preferred and not necessary.

Although the quantity of impurity, e.g. aromatics and nonhydrocarbons such as sulfur or color body, may vary over a wide extent, it usually will be from 0.0001 to less than 5, preferably 0.01 to 3.5 and even more preferably, 0.08 to 3 wt. percent. Moreover, although in this preferred version of the invention adsorption is carried out in vapor phase it can also be carried out in liquid phase as well as mixed liquid-vapor phase.

Although the invention has been described with some particularity, it will be understood that variations and modifications can be made therein without departing from the spirit of the invention as hereinafter claimed.

What is claimed is:

1. A process for separating impurities from $C_{10}$ to $C_{25}$ hydrocarbons containing .0001 to 5 wt. percent impurities, said impurities consisting of at least one impurity from the group consisting of aromatics, sulfur, and color bodies, which comprises contacting said $C_{10}$ to $C_{25}$ hydrocarbons with a type X zeolitic adsorbent until .03 to .7 w. feed/w. adsorbent pass over said zeolitic adsorbent, desorbing at least a first portion of the adsorbed components with a gaseous displacing agent and recycling the said first desorbed portion over the said zeolitic adsorbent, desorbing the remaining adsorbed components with a gaseous displacing agent and continuing said process until the desired quantity of purified $C_{10}$ to $C_{25}$ hydrocarbon has been obtained.

2. A process according to claim 1 wherein said hydrocarbon is a saturated hydrocarbon.

3. A process according to claim 1 wherein said hydrocarbon is an olefin.

4. A process according to claim 1 wherein said hydrocarbon is a mixture of olefin and saturated hydrocarbon.

5. A process according to claim 1 wherein said hydrocarbon is a normal paraffin.

6. A process according to claim 1 wherein said hydrocarbon is a saturate and said adsorbent components are unsaturates.

7. A method according to claim 1 wherein the adsorption temperature is 400 to 800° F.

8. A method according to claim 1 wherein the adsorption pressure is 1 to 100 p.s.i.a.

9. A method according to claim 1 wherein the temperature of desorption is 400 to 800° F.

10. A method according to claim 1 wherein the pressure of desorption is 1 to 100 p.s.i.a.

11. A method according to claim 1 wherein said adsorbent is a type X sieve with monovalent cations.

12. A method according to claim 1 wherein said adsorbent is a type X sieve with divalent cations.

13. A method according to claim 1 wherein said gaseous displacing agent is

wherein $R_1$, $R_2$ and $R_3$ are chosen from the group consisting of H and $C_1$ to $C_5$ alkyl groups.

14. A method according to claim 1 wherein said gaseous displacing agent is $SO_2$.

15. A method according to claim 13 wherein said displacing agent is $NH_3$.

16. The process of claim 1 wherein the said first desorbed portion comprises 50 to 80 wt. percent of the adsorbed components.

References Cited by the Examiner

UNITED STATES PATENTS

| 2,971,993 | 2/1961 | Kimberlin et al. | 260—674 |
| 3,063,934 | 11/1962 | Epperly et al. | 260—676 |
| 3,070,542 | 12/1962 | Asher et al. | 260—676 |
| 3,083,245 | 3/1963 | Lindahl | 260—676 |
| 3,098,814 | 7/1963 | Epperly | 260—674 |

FOREIGN PATENTS 851,977  10/1960  Great Britain.

ALPHONSO D. SULLIVAN, *Primary Examiner.*

PAUL M. COUGHLAN, *Examiner.*